(12) United States Patent
Roeper

(10) Patent No.: US 8,884,580 B2
(45) Date of Patent: Nov. 11, 2014

(54) CHARGE EQUALIZATION BETWEEN SERIES-CONNECTED BATTERY CELLS

(75) Inventor: Wolfgang Roeper, Neuenstein (DE)

(73) Assignee: Atmel Automotive GmbH, Heilbronn (DE)

( * ) Notice: Subject to any disclaimer, the term of this patent is extended or adjusted under 35 U.S.C. 154(b) by 348 days.

(21) Appl. No.: 13/246,478

(22) Filed: Sep. 27, 2011

(65) Prior Publication Data

US 2012/0074895 A1    Mar. 29, 2012

Related U.S. Application Data

(60) Provisional application No. 61/387,294, filed on Sep. 28, 2010.

(51) Int. Cl.
*H02J 7/00*    (2006.01)

(52) U.S. Cl.
CPC ............ *H02J 7/0019* (2013.01); *Y02T 10/7055* (2013.01)
USPC ........................................................ 320/103

(58) Field of Classification Search
USPC ........................................................ 320/103
See application file for complete search history.

(56) References Cited

U.S. PATENT DOCUMENTS

| | | | | |
|---|---|---|---|---|
| 5,821,729 | A * | 10/1998 | Schmidt et al. | 320/126 |
| 6,064,178 | A * | 5/2000 | Miller | 320/117 |
| 6,356,055 | B1 * | 3/2002 | Lin et al. | 320/116 |
| 6,538,414 | B1 | 3/2003 | Tsuruga | |
| 7,245,108 | B2 * | 7/2007 | Chertok et al. | 320/132 |
| 7,612,530 | B2 * | 11/2009 | Konishi et al. | 320/120 |
| 2005/0017682 | A1 * | 1/2005 | Canter et al. | 320/118 |
| 2008/0191663 | A1 * | 8/2008 | Fowler et al. | 320/118 |
| 2009/0322155 | A1 * | 12/2009 | Oh et al. | 307/87 |
| 2010/0117593 | A1 * | 5/2010 | Piccard et al. | 320/104 |
| 2010/0148726 | A1 * | 6/2010 | Lee et al. | 320/118 |

FOREIGN PATENT DOCUMENTS

| | | |
|---|---|---|
| DE | 101 57 003 | 5/2002 |
| EP | 0 432 639 | 6/1991 |
| WO | 2010/093186 | 8/2010 |

OTHER PUBLICATIONS

Wen, Sihua, "Cell Balancing Buys Extra Run Time and Battery Life," *Analog Applications Journal*, 1Q 2009.

Kutkut, N. H. et al., "Dynamic Equalization Techniques for Series Battery Stacks," *Telecommunications Energy Conference*, 1996. INTELEC '96., 18th International, Oct. 6-10, 1996.

Bonfiglio, C. et al., "Cost Optimized Battery Management System with Active Cell Balancing for Lithium Ion Battery Stacks," *Vehicle Power and Propulsion Conference*, VPPV '09, Sep. 7-10, 2009.

(Continued)

*Primary Examiner* — Samuel Berhanu
*Assistant Examiner* — Jerry D Robbins
(74) *Attorney, Agent, or Firm* — Fish & Richardson P.C.

(57) ABSTRACT

In one embodiment, a method includes receiving a first input current from a battery through a first connection and a second connection and generating a first output current through a third connection to a first node and a fourth connection to a second node. The first and second nodes are configured to output the first output current to an energy store configured to store a charge. The method includes receiving a second input current through the third connection from the first node and the fourth connection from the second nodes and generating a second output current through the first and second connections to charge the battery.

14 Claims, 4 Drawing Sheets

(56) References Cited

OTHER PUBLICATIONS

Office Action and English translation for German Patent Application 10 210 046 701.4, Jul. 29, 2011.

Schmidt, H. et al., "The charge equalizer—a new system to extend battery lifetime in photovoltaic systems, UPS and electric vehicles" *Telecommunications Energy Conference*, INTELEC'93. 15th International, vol. 2, pp. 146-151,27-30, Sep. 1993.

* cited by examiner

CHARGE EQUALIZATION BETWEEN SERIES-CONNECTED BATTERY CELLS

RELATED APPLICATIONS

This application claims the benefit, under 35 U.S.C. §119 (e), of U.S. Provisional Patent Application No. 61/387,294, filed 28 Sep. 2010. This application also claims the benefit, under 35 U.S.C. §119(a), of German Patent Application No. 102010046701.4-32, also filed 28 Sep. 2010.

TECHNICAL FIELD

This disclosure relates to circuits.

BACKGROUND

A battery pack or cell pack (such as for example a Li-Ion cell pack) may have multiple battery cells connected in series.

DESCRIPTION OF EXAMPLE EMBODIMENTS

Figure 1:
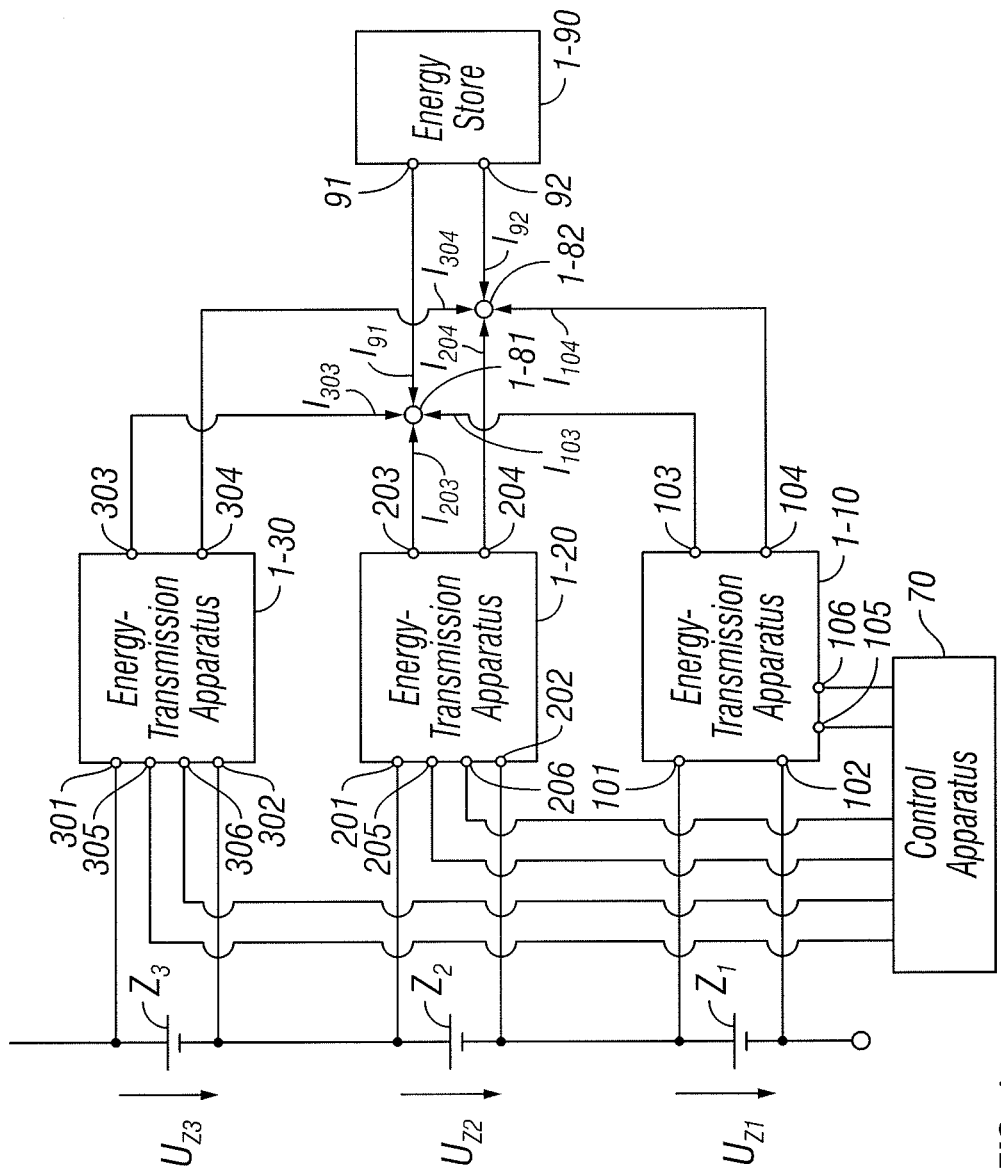
FIG. 1 shows a schematic block circuit diagram of a first example embodiment of a circuit for charge equalization.

This disclosure provides a circuit and a method for charge equalization between series-connected battery cells.

N. H. Kutkut, *Dynamic Equalization Techniques for Series Battery Stacks*, 18TH INTERNATIONAL TELECOMMUNICATIONS ENERGY CONFERENCE, Oct. 6-10, 1996, teaches circuits for the dissipative and non-dissipative charge equalization of series-connected lithium-ion battery cells. Lithium-ion batteries are operated in frequent instances in rather large series circuits of many cells, so-called "stacks" in order to achieve a high total voltage. Since the cells are subject to a strong production leakage it is not possible without additional measures to optimally fully charge each individual cell. The weakest cell limits the energy that may be removed from the stack or charged into it on account of the series circuit. It is therefore desirable, in particular given the background of the high cost for lithium-ion battery cells, to utilize the capacity of the stack as optimally as possible. This becomes possible if it is successful by using additional measures to fully charge each individual cell of the series circuit in accordance with its maximal capacity during the charging process and to remove the entire energy during discharging.

In addition, the capacities of the cells diverge due to aging, self-charging, and other leakage currents over time. This then has the result that the removable energy in the battery becomes smaller. The running time of the apparatus operated with it, e.g., an electric car, therefore becomes shorter. In order to counteract this, the cells must be rebalanced again from time to time by a charge equalization.

"Passive balancing" is a method for charge equalization where the cells that are just before overcharging are discharged by resistors connected in parallel to the cell. However, in passive balancing, the entire excess energy is converted into heat due to energy losses. Recent methods operate with low-loss storage elements, such as with coils.

Sihua Wen, *Cell Balancing Buys Extra Run Time and Battery Life*, TEX. INSTRUMENTS INC., ANALOG APPLICATIONS J., 1Q 2009, teaches a circuit for charge equalization. Energy is pumped from a cell to the adjacent cell through the circuit by a coil and two metal-oxide semiconductor (MOS) field effect transistors (FETs) per battery cell. High equalization currents between adjacent cells are possible through the circuit. However, in the normal case the cell that should emit energy and the cell that must receive this energy are not directly adjacent to one another but rather separated from one another by a few cells. The charge must therefore be pumped in several cycles from cell to cell before it finally arrives where it is actually needed. This drastically reduces the total degree of effectiveness of the circuit and the equalization of the charges takes a long time.

C. Bonfiglio & W. Rössler, *A Cost optimized Battery Management System with Active Cell Balancing for Lithium Ion Battery Stacks*, VEHICLE POWER AND PROPULSION CONFERENCE, Sep. 7-10, 2009, also teaches a circuit for charge equalization. A large transmitter is used in the circuit that comprises a secondary winding for each battery cell. The single primary winding may be connected to the entire series circuit of the battery cells. The circuit permits either the energy from the stack to be removed and to be purposely pushed into any cell or permits the energy to be removed from any cell and to be fed back into the entire stack. The advantage of the circuit is that the cells may be treated in a purposeful manner. Large currents may be generated for the charge equalization. The required special transmitter is expensive and, in addition, limits the number of cells that may be equalized by the circuit.

Particular embodiments provide an improved circuit for charge equalization.

Particular embodiments provide a circuit for charge equalization between series-connected battery cells. In particular embodiments, the circuit comprises a first number of first energy-transmission apparatuses. Each energy-transmission apparatus may transmit energy for charging and discharging the associated battery cell. Each first energy-transmission apparatus is associated with at least one battery cell.

In particular embodiments, each first energy-transmission apparatus comprises a first connection and a second connection for connecting to the associated battery circuit. The first and the second connection may be connected to a housing connection of a semiconductor chip to which the associated battery cell may be connected.

In particular embodiments, each first energy-transmission apparatus comprises a third connection and a fourth connection. Each third connection of the first energy-transmission apparatuses is connected to a first node and each fourth connection of the first energy-transmission apparatuses is connected to a second node. In particular embodiments, the currents through the third connections of the energy-transmission apparatuses are summed up in the first node, and the currents through the fourth connections are summed up in the second node. The current enters with a positive or negative sign into the summation as a function of whether the associated battery cell is being charged or discharged.

In particular embodiments, every first energy-transmission apparatus is set up for bidirectional energy transmission. For the bidirectional energy transmission each first energy-transmission apparatus is set up to generate a first output current through the third connection and the fourth connection using a controlled first input current through the first connection and the second connection. In particular embodiments, the first controlled input current discharges the associated battery cell.

In particular embodiments, for the bidirectional transmission of energy, each first energy-transmission apparatus is set up to generate a second output current through the first connection and the second connection using a controlled second input current through the third connection and the fourth connection. In particular embodiments, the second output current charges the associated battery cell.

Particular example embodiments are illustrated in FIG. 1. The energy-transmission apparatuses make it possible to transmit energy from any battery cell to an intermediate storage. As a result of the formation of the energy-transmission apparatuses for the bidirectional transmission of energy, charge may be exchanged among the battery cells almost as desired. The energy-transmission apparatuses make it possible to transmit energy in both directions so that each battery cell may be charged or discharged isochronously, yet individually. As a result, the entire stack may be balanced in a very short time. High charging or discharging currents may be used. It is possible that the charge equalization may be carried out even during a charging or discharging of the entire series circuit, during which each battery cell of the stack may be fully charged. This increases the range, e.g., of electric cars, or a cheaper battery type may be used. Particular embodiments are an economical solution because only relatively few standard structural elements are used.

Particular embodiments provide an improved method for charge equalization.

Particular embodiments provide a method for the charge equalization between series-connected battery cells. In particular embodiments, a circuit comprises a number energy-transmission apparatuses. Each energy-transmission apparatus is associated with a battery cell. The energy-transmission apparatuses are controlled by a control apparatus for charging or discharging the associated battery cell. In particular embodiments, at least two energy-transmission apparatuses connected via nodes are simultaneously controlled by the control apparatus for charging or discharging the associated battery cell so that a number of currents of the charging and discharging procedures may be summed up in the nodes.

In particular embodiments, the first node and the second node may be connected to an energy store apparatus. In particular embodiments, the first node and the second node are connected to different connections of the energy store apparatus.

In particular embodiments, the energy store apparatus may be a separate battery cell. In particular embodiments, the energy store apparatus may be a capacitor. In particular embodiments, the energy store apparatus may have a double function as a battery cell of the series-connected battery cells.

In particular embodiments, the circuit comprises a second number of second energy-transmission apparatuses. Each second energy-transmission apparatus is associated with a battery cell of the series circuit of battery cells. Each third connection of the second energy-transmission apparatuses is connected to a third node. Each fourth connection of the second energy-transmission apparatuses is connected to a fourth node. The currents through the third connections of the second energy-transmission apparatuses are summed up here in the third node and the currents through the fourth connections of the second energy-transmission apparatuses are summed up in the fourth node.

In particular embodiments, the first node and the second node are connected to the third node and to the fourth node by another energy-transmission apparatus for the bidirectional transmission of energy. In particular embodiments, the third node and the fourth node may be connected to another energy store apparatus. In particular embodiments, the third node and the fourth node are connected to different connections of the energy store apparatus. Thus, energy may be shifted between the energy store and the other energy store by the other energy-transmission apparatus.

In particular embodiments, each energy-transmission apparatus has a first inductor and a second inductor. In particular embodiments, the first inductor and the second inductor may be coupled in a transformer-like manner. In particular embodiments, each energy-transmission apparatus may comprise a transmitter with the first inductor that may be designated as the primary winding and with the second inductor that may be designated as the secondary winding.

In particular embodiments, each energy-transmission apparatus comprises at least one first semiconductor switch connected in series to the first inductor and comprises at least one second semiconductor switch connected in series to the second inductor. In particular embodiments, the first semiconductor switch and the second semiconductor switch are wired for controlling the transmission of energy. In particular embodiments, the first semiconductor switch and the second semiconductor switch are transistors, for example, bipolar transistors or FETs.

In particular embodiments, the circuit comprises a control apparatus that is connected to each energy-transmission apparatus for controlling the transmission of energy. In particular embodiments, the control apparatus may be connected to control connections of the first semiconductor switch and of the second semiconductor switch of a particular energy-transmission apparatus. In particular embodiments, the control apparatus may be set up to control an isochronous transmission of energy from at least two of the energy-transmission apparatuses.

Particular embodiments are advantageous individually as well as in combination. Particular embodiments may be combined with each other. In order to simply the discussion, a few possible combinations are explained in the description of the example embodiments of the figures. However, there are many possible combinations of particular embodiments.

FIG. 1 schematically shows an example circuit for the charge equalization with an example block circuit diagram. In particular embodiments, the circuit is shown for three battery cells $Z_1$, $Z_2$ and $Z_3$ and may be readily expanded to a larger number of battery cells. In particular embodiments, for example, the three battery cells $Z_1$, $Z_2$ and $Z_3$ may be readily expanded to sixteen battery cells. Battery cells $Z_1$, $Z_2$, $Z_3$ are connected in series, whereby the cell voltages $U_{Z1}$, $U_{Z2}$, $U_{Z3}$ of cells $Z_1$, $Z_2$, $Z_3$ are added to each other. For the equalization of a different charge of battery cells $Z_1$, $Z_2$, $Z_3$ a first cell $Z_1$ with a higher charge is discharged and a second cell $Z_2$ with a low charge is charged by a discharge of the first cell $Z_1$. In particular embodiments, during the charging and discharging procedures the dissipation should be as small as possible.

In FIG. 1, two connections of each battery cell $Z_1$, $Z_2$, $Z_3$ are connected to an energy-transmission apparatus 1-10, 1-20, 1-30. The first energy-transmission apparatus 1-10 has a first connection 101 and a second connection 102 that are connected to the first battery cell $Z_1$. The second energy-transmission apparatus 1-20 also has a first connection 201 and a second connection 202 that are connected to the second battery cell $Z_2$. The third energy-transmission apparatus 1-30 has a first connection 301 and a second connection 302 that are connected to the third battery cell $Z_3$. In particular embodiments, other energy-transmission apparatuses and battery cells may be provided in a corresponding manner, as is indicated by dots in FIG. 1.

In particular embodiments, the first energy-transmission apparatus 1-10 has a third connection 103 and a fourth connection 104. The third connection 103 is connected to a first node 1-81 and the fourth connection is connected to a second node 1-82. In particular embodiments, the first energy-transmission apparatus 1-10 is set up for the bidirectional transmission of energy between the connections 101, 102 on the cell side and between the connections 103, 104 on the node side. In particular embodiments, the second energy-transmission apparatus 1-20 is set up for the bidirectional transmission of energy between the connections 201, 202 on the cell side and between connections 203, 204 on the node side and the third energy-transmission apparatus 1-30 is set up for the bidirectional transmission of energy between connections 301, 302 on the cell side and connections 303, 304 on the node side.

In particular embodiments, all third connections 103, 203, 303 of energy-transmission apparatuses 1-10, 1-20, 1-30 are connected to the first node 1-81. In particular embodiments, all fourth connections 104, 204, 304 of the energy-transmission apparatuses 1-10, 1-20, 1-30 are connected to the second node 1-82. The currents $I_{103}$, $I_{203}$, $I_{303}$ are summed by the third connections 103, 203, 303 in the first node 1-81. In particular embodiments, the currents $I_{104}$, $I_{204}$, $I_{304}$ of the fourth connections 104, 204, 304 are summed in the second node 1-82. In addition, in the exemplary embodiment of FIG. 1 an energy store 1-90 is connected to the first node 1-81 and to the second node 1-82. In particular embodiments, energy store 1-90 may store a charge. In particular embodiments, for example, energy store 1-90 is a separate battery cell or a capacitor. In FIG. 1, the currents $I_{91}$, $I_{92}$ of energy store 1-90 additionally enter into the current summation in nodes 1-81, 1-82. In particular embodiments, the sum of currents $I_{103}$, $I_{203}$, $I_{303}$, $I_{91}$ in the first node and the sum of currents $I_{104}$, $I_{204}$, $I_{304}$, $I_{92}$ in the second node 1-82 are each zero, so that an energy excess is intermediately stored in energy store 1-90.

Figure 2:
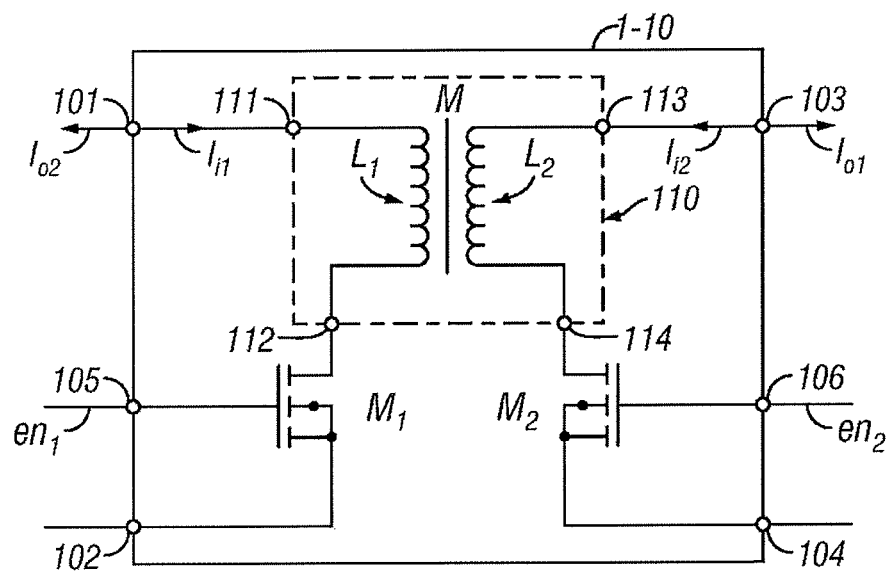
FIG. 2 shows a schematic circuit diagram of an example embodiment of an energy-transmission apparatus.

Particular embodiments of an example energy-transmission apparatus 1-10 are shown in FIG. 2. In particular embodiments, energy-transmission apparatus 1-10 is set up, based on a controlled first input current $I_{i1}$ that flows through first connection 101 and second connection 102, to generate a first output current $I_{o1}$ that flows through third connection 103 and fourth connection 104.

In particular embodiments, a transmission of energy in the opposite direction is possible. In particular embodiments, energy-transmission apparatus 1-10 is set up, based on a controlled second input current $I_{i2}$ that flows through third connection 103 and fourth connection 104, to generate a second output current $I_{o2}$ that flows through first connection 101 and second connection 102.

In particular embodiments, energy-transmission apparatus 1-10 may be set up for a separation of potential. In FIG. 2, energy-transmission apparatus 1-10 comprises a transmitter 110 with a first inductor $L_1$ and with a second inductor $L_2$. In particular embodiments, the first inductor $L_1$ and the second inductor $L_2$ may be coupled in a transformer-like manner M. In particular embodiments, for example, first inductor $L_1$ and the second inductor $L_2$ may be coupled by a material with a high magnetic conductivity, such as ferrite. In FIG. 2, a first semiconductor switch $M_1$ in the form of a first FET $M_1$ is coupled in series to first inductor $L_1$. A second semiconductor switch $M_2$ in the form of a second FET $M_2$ is coupled in series to second inductor $L_2$. In particular embodiments, as an alternative to FETs, other semiconductor switches, such as bipolar transistors, may be used.

In FIG. 2, the first inductor $L_1$ is connected to the first connection 101, the first semiconductor switch $M_1$ is connected to the second connection 102, the second inductor $L_2$ is connected to the third connection 103 and the second semiconductor switch $M_2$ is connected to the fourth connection 104 of energy-transmission apparatus 1-10. In particular embodiments, based on the construction size, transmitter 110 with inductivities $L_1$ and $L_2$ may not be integrated on a semiconductor chip but rather may be connected as an external structural element via the housing connections 111, 112, 113 114 to the semiconductor chip with semiconductor switches $M_1$ and $M_2$.

In particular embodiments, for control, the control connection (gate) of the first semiconductor switch $M_1$ is connected to a fifth connection 105 and the control connection (gate) of the second semiconductor switch $M_2$ is connected to a sixth connection 106 of energy-transmission apparatus 1-10. In particular embodiments, for discharging, the transmission of energy takes place via energy-transmission apparatus 1-10 in that the first semiconductor switch $M_1$ is controlled by the first control signal $en_1$ and switches on a first input current $I_{i1}$ via the first inductor $L_1$. In particular embodiments, a magnetic field is built up by the first input current $I_{i1}$. In particular embodiments, the first semiconductor switch $M_1$ is subsequently opened and the second semiconductor switch $M_2$ is closed by a control with the second control signal $en_2$. In particular embodiments, a voltage is induced by the built-up magnetic field in the second inductor $L_2$ which voltage brings about a first output current $I_{o1}$ via the third connection 103 and the fourth connection 104 when the second semiconductor switch $M_2$ is closed.

In particular embodiments, the transmission of energy for charging cell $Z_1$ connected to first connection 101 and to second connection 102 takes place in the opposite direction. In particular embodiments, for charging cell $Z_1$, the transmission of energy takes place by energy-transmission apparatus 1-10 in that the second semiconductor $M_2$ is controlled by the second control signal $en_2$ and switches on a second input current $I_{i2}$ via second inductor $L2$. In particular embodiments, a magnetic field is built up by the second input current $I_{i2}$. In particular embodiments, the second semiconductor switch $M_2$ is subsequently opened and the first semiconductor switch $M_1$ is closed by a control with the first control signal $en_1$. A voltage is induced by the built-up magnetic field in the first inductor $L_1$ which voltage brings about a first output current $I_{o2}$ via the first connection 101 and the second connection 102 and thus a charging current $I_{o2}$ when the first semiconductor switch $M_1$ is closed.

Particular embodiments of an energy-transmission apparatus 1-10, as is shown in FIG. 2, may be readily modified or supplemented. In particular embodiments, for example, it is possible to control a transformation ratio between inductivities $L_1$ and $L_2$ coupled in a transformer-like manner M by means of two other semiconductor switches (not shown) and by a coil tap in each instance (not shown). In particular embodiments, it is also possible to switch input current $I_{i1}$ or $I_{i2}$ by controlling the input-side semiconductor switches as alternating current by means of four semiconductor switches connected to an inductor $L_1$, $L_2$ (not shown in FIG. 2), and to rectify (rectifier) the associated output current $I_{o1}$ and $I_{o2}$ of the other inductor $L_1$ and $L_2$ by controlling the output-side semiconductor switches (not shown in FIG. 2).

In FIG. 1, a control apparatus 70 is connected to the fifth connections 105, 205, 305 and to sixth connections 106, 206, 306 of each of the energy-transmission apparatuses 1-10, 1-20, 1-30. In particular embodiments, control apparatus 70 may be set up to control an isochronous transmission of energy from at least two of the energy-transmission apparatuses 1-10, 1-20. In particular embodiments, for example, the first cell $Z_1$ is discharged and the second cell $Z_2$ charged at the same time. In particular embodiments, for example, a different charge of the first cell $Z_1$ and of the second cell $Z_2$ is determined from particular cell voltage $U_{z1}$, $U_{z2}$ by voltage measuring. In particular embodiments, control circuit 70 then alternately controls the semiconductor switches of the first energy-transmission apparatus 1-10 in such a manner that an input current through connections 101 and 102 generates an output current through connections 103 and 104. In particular embodiments, at the same time control circuit 70 alternately controls the semiconductor switches of the second energy-transmission apparatus 1-20 in such a manner that an input current through connections 203 and 204 generates an output current through connections 201 and 202. In particular embodiments, output currents $I_{103}$ and $I_{104}$ and input currents $I_{203}$ and $I_{204}$ are summed up with different signs in nodes 1-81 and 1-82. In particular embodiments, if the currents $I_{303}$ and $I_{304}$ equal zero, then a differential current flows between output currents $I_{103}$ and $I_{104}$ and input currents $I_{203}$ and $I_{204}$ as charge/discharge current $I_{91}$, $I_{92}$ into energy store 1-90.

Figure 3:
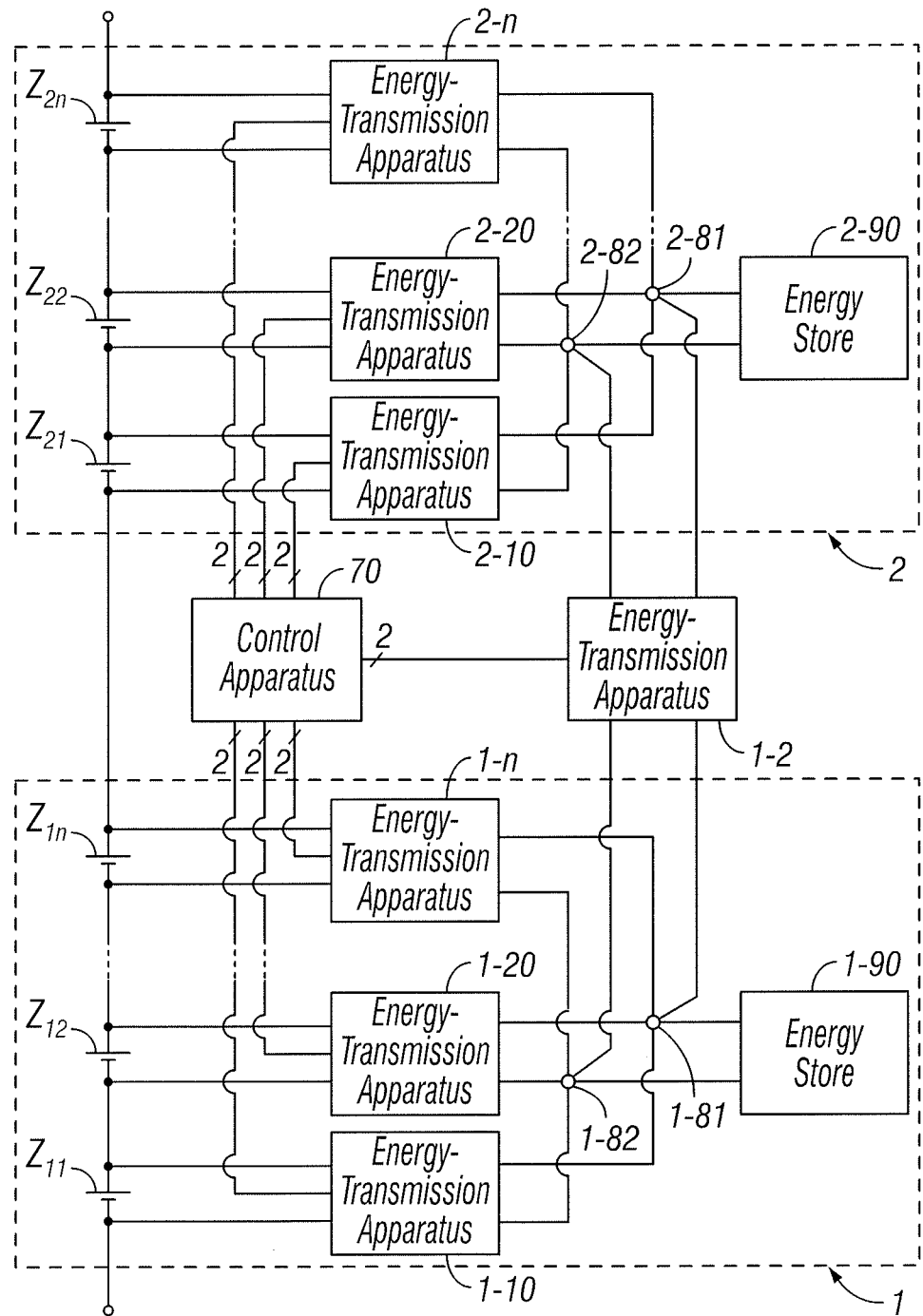
FIG. 3 shows a schematic block circuit diagram of a second example embodiment of a circuit for charge equalization.

FIG. 3 schematically shows another example embodiment of a circuit for charge equalization between series-connected battery cells $Z_{11}$, $Z_{12}$, $Z_{1n}$, $Z_{21}$, $Z_{22}$, $Z_{2n}$, as a block diagram. In particular embodiments, battery cells $Z_{11}$, $Z_{12}$ to $Z_{1n}$ are combined in a first cluster 1. In particular embodiments, the first cluster 1 has a first number of first energy-transmission apparatuses 1-10, 1-20, 1-n. In particular embodiments, for example, sixteen energy-transmission apparatuses are provided for sixteen battery cells. Each first energy-transmission apparatus 1-10, 1-20, 1-n is associated with a battery cell $Z_{11}$, $Z_{12}$, $Z_{1n}$.

In particular embodiments, each first energy-transmission apparatus 1-10, 1-20, 1-n is connected by two cell-side connections to the associated battery cell $Z_{11}$, $Z_{12}$, $Z_{1n}$. Each first energy-transmission apparatus 1-10, 1-20, 1-n of the first cluster 1 is connected to a first node 1-81 and to a second node 1-82. In particular embodiments, the currents of the first energy-transmission apparatuses 1-10, 1-20, 1-n are summed up in the nodes 1-81, 1-82. In particular embodiments, each first energy-transmission apparatus 1-10, 1-20, 1-n is set up for a bidirectional transmission of energy. In particular embodiments, a control apparatus 70 is connected for controlling the first energy-transmission apparatuses 1-10, 1-20, 1-n to each energy-transmission apparatus 1-10, 1-20, 1-n.

In particular embodiments, in a second cluster 2 a second number of second energy-transmission apparatuses 2-10, 2-20, 2-n is provided, whereby each second energy-transmission apparatus 2-10, 2-20, 2-n is associated with one of the series-connected battery cells $Z_{21}$, $Z_{22}$, $Z_{2n}$. In particular embodiments, the clustering reduces the requirements on the dielectric strength of the semiconductor elements of the circuit so that less chip surface is required.

In particular embodiments, the second energy-transmission apparatuses 2-10, 2-20, 2-n are connected to a third node 2-81 and to a fourth node 2-82. The currents of the second energy-transmission apparatuses 2-10, 2-20, 2-n are summed up in the third and fourth nodes 2-81, 2-82. In particular embodiments, every second energy-transmission apparatus 2-10, 2-20, 2-n is set up for the bidirectional transmission of energy. In particular embodiments, the first and second nodes 1-81 and 1-82 are connected to the third and fourth nodes 2-81 and 2-82 by another energy-transmission apparatus 1-2 that makes possible a transfer of energy between first cluster 1 and second cluster 2. In particular embodiments, control apparatus 70 is connected for the control of the second energy-transmission apparatuses 2-10, 2-20, 2-n and of the other energy-transmission apparatus 1-2 to them.

In particular embodiments, the first node 1-81 and the second node 1-82 are connected to an energy store apparatus 1-90. In FIG. 3, the third node 2-81 and the fourth node 2-82 are connected to another energy store apparatus 2-90. In particular embodiments, energy store apparatuses 1-90, 2-90 may be, for example, separate battery cells.

Figure 4:
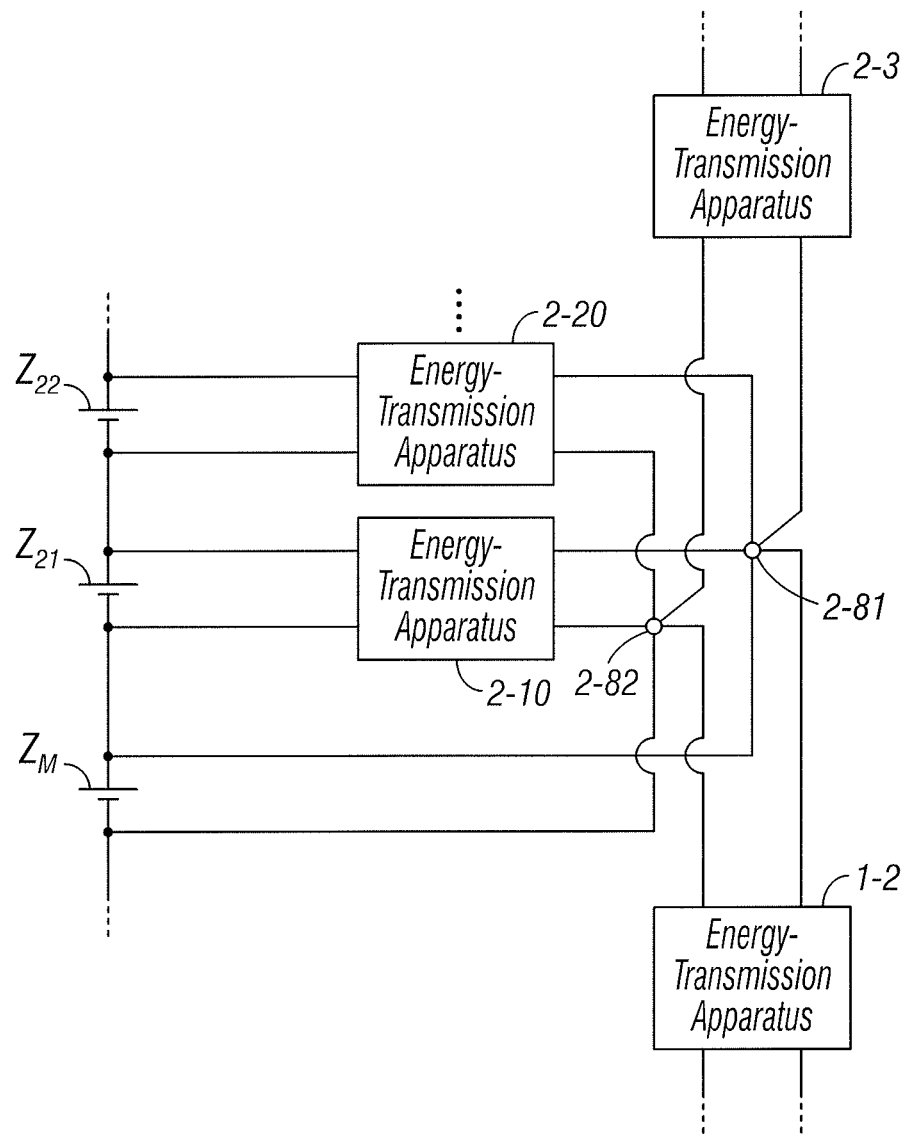
FIG. 4 shows a schematic block circuit diagram of a third example embodiment of a circuit for charge equalization.

FIG. 4 schematically shows another example embodiment of a circuit for charge equalization between series-connected battery cells $Z_M$, $Z_{21}$, $Z_{22}$ as a block diagram. In particular embodiments, the circuit expense may be further reduced by using one or more battery cells $Z_M$ of the series circuit as an intermediate store. In FIG. 4, the further battery cell $Z_M$ may be connected to the further battery cells $Z_{21}$, $Z_{22}$ in series. The further battery cell $Z_M$ is connected to both nodes 2-81 and 2-82. In particular embodiments, battery cells $Z_{21}$, $Z_{22}$ are connected by an energy-transmission apparatus 2-10 and 2-20 to nodes 2-81 and 2-82. In particular embodiments, the charge equalization of cells $Z_{21}$, $Z_{22}$, $Z_M$ occurs via nodes 2-81, 2-82. In particular embodiments, battery cell $Z_M$ has dual functionality both as energy store $Z_M$ for the intermediate storage during the charge equalization and as a component of the series circuit for generating a total voltage of the series circuit. The charge equalization of all battery cells $Z_{21}$, $Z_{22}$, $Z_M$ may occur simultaneously even in particular embodiments. In particular embodiments, nodes 2-81, 2-82 are connected via two further energy-transmission apparatuses 1-2, 2-3 to further nodes of further clusters. In particular embodiments, even the further nodes may be connected (not shown in FIG. 4) to a further battery cell of the series circuit.

Particular embodiments are not limited to the example embodiments illustrated in FIGS. 1 to 4. Particular embodiments, for example, provide a different energy-transmission apparatus than the apparatus shown in FIG. 2. Particular embodiments may combine a greater or lesser number of energy-transmission apparatuses for a cluster. The functionality of the circuit according to FIG. 3 may be used for a series circuit of lithium-ion batteries of a motor vehicle (electric car).

The following is a list of reference symbols and numbers in FIGS. 1 to 4, provided for example illustration purposes only and not by way of limitation:

1, 2 cluster
1-10, 1-20, 1-30, 1-n, 2-10, 2- energy-transmission apparatus
20, 2-n, 1-2, 2-3
1-81, 1-82, 2-81, 2-82 node
1-90, 2-90 energy store, battery cell
70 control apparatus
91, 92, 101, 102, 103, 104, connection
105, 106, 201, 202, 203, 204,
205, 206, 301, 302, 303, 304,
305, 306
110 transmitter
111, 112, 113, 114 housing connection
$L_1$, $L_2$ inductor, coil
M transformer-like coupling
$M_1$, $M_2$ semiconductor switch, FET
$en_1$, $en_2$ control signal
$I_{103}$, $I_{104}$, $I_{203}$, $I_{204}$, $I_{303}$, $I_{304}$, $I_{91}$, current
$I_{92}$, $I_{i1}$, $I_{i2}$, $I_{o1}$, $I_{o2}$,
$U_{Z1}$, $U_{Z2}$, $U_{Z3}$, voltage
$Z_M$, $Z_1$, $Z_2$, $Z_3$, $Z_3$, $Z_{11}$, $Z_{12}$, $Z_{1n}$, battery cell, cell
$Z_{21}$, $Z_{22}$, $Z_{2n}$ Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A circuit comprising:
a first cluster comprising a first energy transmitter coupled to a first node and a second node, the first energy transmitter configured to:
receive a first input current from a first battery through a first connection and a second connection;
generate a first output current through a third connection to the first node and a fourth connection to the second node;
receive a second input current through the third and fourth connections from the first and second nodes;
generate a second output current through the first and second connections to charge the first battery; and
a second cluster comprising a second energy transmitter coupled to a third node and a fourth node, the second energy transmitter configured to:
receive a third input current from a second battery through a fifth connection and a sixth connection;
generate a third output current through a seventh connection to the third node and an eighth connection to the fourth node;
receive a fourth input current through the seventh and eighth connections from the third and fourth nodes;
generate a fourth output current through the fifth and sixth connections to charge the second battery; and
a third energy transmitter coupled to the first cluster and the second cluster, the third energy transmitter configured to transfer current between the first cluster and the second cluster.

2. The circuit of claim 1, wherein:
the first energy transmitter comprises:
a first transmitter comprising a first inductor coupled to a second inductor;
a first semiconductor switch coupled in series to the first inductor and coupled to the second connection;
a second semiconductor switch coupled in series to the second inductor and coupled to the fourth connection; and
the second energy transmitter comprises:
a second transmitter comprising a third inductor coupled to a fourth inductor;
a third semiconductor switch coupled in series to the third inductor and coupled to the sixth connection; and
a fourth semiconductor switch coupled in series to the fourth inductor and coupled to the eighth connection.

3. The circuit of claim 2, wherein:
the first and second inductors are coupled in a transformer-like manner; and
the third and fourth inductors are coupled in a transformer-like manner.

4. The circuit of claim 1, further comprising a controller coupled to the first, second, and third energy transmitters and configured to control the transmission of energy.

5. The circuit of claim 4, wherein:
the first battery is coupled in series to one or more other batteries, each of the other batteries being coupled to one or more other energy transmitters, the other energy transmitters being coupled to the controller; and
the controller is configured to control an isochronous transmission of energy from the first energy transmitter and at least one of the other energy transmitters.

6. The circuit of claim 1, further comprising:
a first energy store coupled to the first and second nodes; and
a second energy store coupled to the third and fourth nodes, the first and second energy stores being configured to store a charge.

7. The circuit of claim 6, wherein the first and second energy stores comprise one of another battery or a capacitor.

8. A method comprising:
receiving a first input current from a first battery through a first connection and a second connection of a first cluster;
generating a first output current through a third connection to a first node and a fourth connection to a second node, the first and second nodes configured to output the first output current to an energy store of the first cluster, the energy store configured to store a charge;
receiving a second input current through the third connection from the first node and the fourth connection from the second node;
transferring, by an energy transmitter, the second input current from the first cluster to a second cluster;
receiving the second input current from the energy transmitter through a seventh connection and an eighth connection of the second cluster; and
generating a second output current through the fifth and sixth connections to charge a second battery of the second cluster.

9. The method of claim 8, wherein the energy store comprises one of another battery cell or a capacitor.

10. A system comprising:
a first cluster, the first cluster comprising:
a first battery;
a first energy transmitter coupled to the first battery via a first connection and a second connection;
a first node coupled to a third connection of the first energy transmitter;
a second node coupled to a fourth connection of the first energy transmitter;
a first energy store coupled to the first and second nodes, the first energy store being configured to store a charge; and
the first energy transmitter, configured to:
receive a first input current from the first battery through the first and second connections;
generate a first output current through the third and fourth connections to the first and second nodes;
receive a second input current through the third and fourth connections from the first and second nodes;
generate a second output current through the first and second connections to charge the first battery; and a second cluster, the second cluster comprising:
  a second battery;
  a second energy transmitter coupled to the second battery via a fifth connection and a sixth connection;
  a third node coupled to a seventh connection of the second energy transmitter;
  a fourth node coupled to an eighth connection of the second energy transmitter;
  a second energy store coupled to the third and fourth nodes, the second energy store being configured to store a charge; and
  the second energy transmitter, configured to:
    receive a third input current from the second battery through the fifth and sixth connections;
    generate a third output current through the seventh and eighth connections to the third and fourth nodes;
    receive a fourth input current through the seventh and eighth connections from the third and fourth nodes; and
    generate a fourth output current through the fifth and sixth connections to charge the second battery;
a third energy transmitter coupled to the first cluster and the second cluster, the third energy transmitter configured to transfer current between the first cluster and the second cluster; and
a controller coupled to the first, second, and third energy transmitters and configured to control the transmission of energy.

11. The system of claim 10, wherein
the first battery is coupled in series to one or more other batteries, each of the other batteries being coupled to one or more other energy transmitters, the other energy transmitters being coupled to the controller; and
the controller is configured to control an isochronous transmission of energy from the first energy transmitter and at least one of the other energy transmitters.

12. The system of claim 10, wherein:
the first energy transmitter comprises:
  a first transmitter comprising a first inductor coupled to a second inductor;
  a first semiconductor switch coupled in series to the first inductor and coupled to the second connection;
  a second semiconductor switch coupled in series to the second inductor and coupled to the fourth connection; and
the second energy transmitter comprises:
  a second transmitter comprising a third inductor coupled to a fourth inductor;
  a third semiconductor switch coupled in series to the third inductor and coupled to the sixth connection; and
  a fourth semiconductor switch coupled in series to the fourth inductor and coupled to the eighth connection.

13. The system of claim 12, wherein the first and second inductors are coupled in a transformer-like manner.

14. The system of claim 10, wherein the first energy store comprises one of another battery or a capacitor.

* * * * *